and Sept. 30, 1969

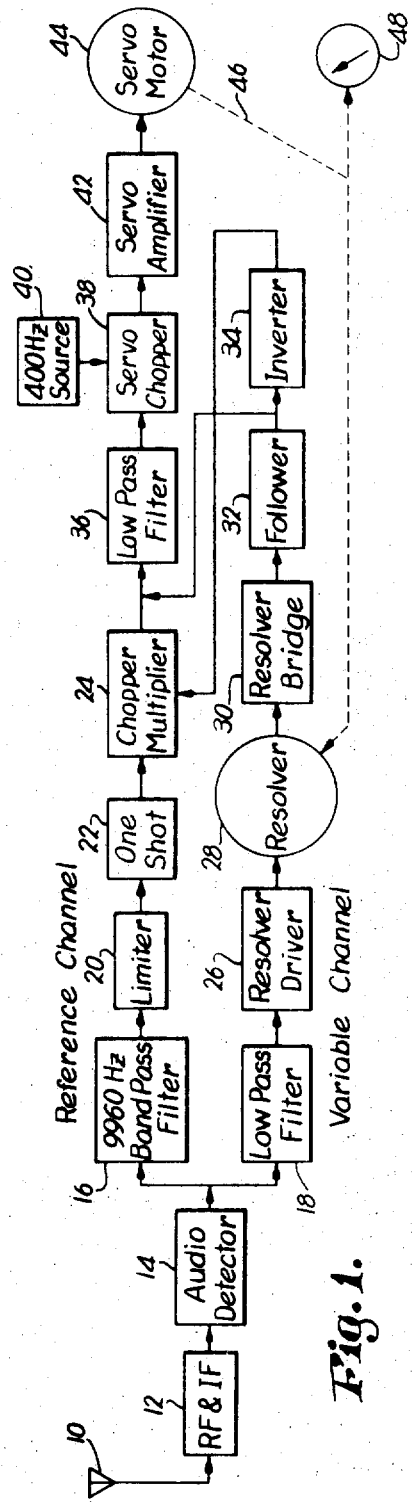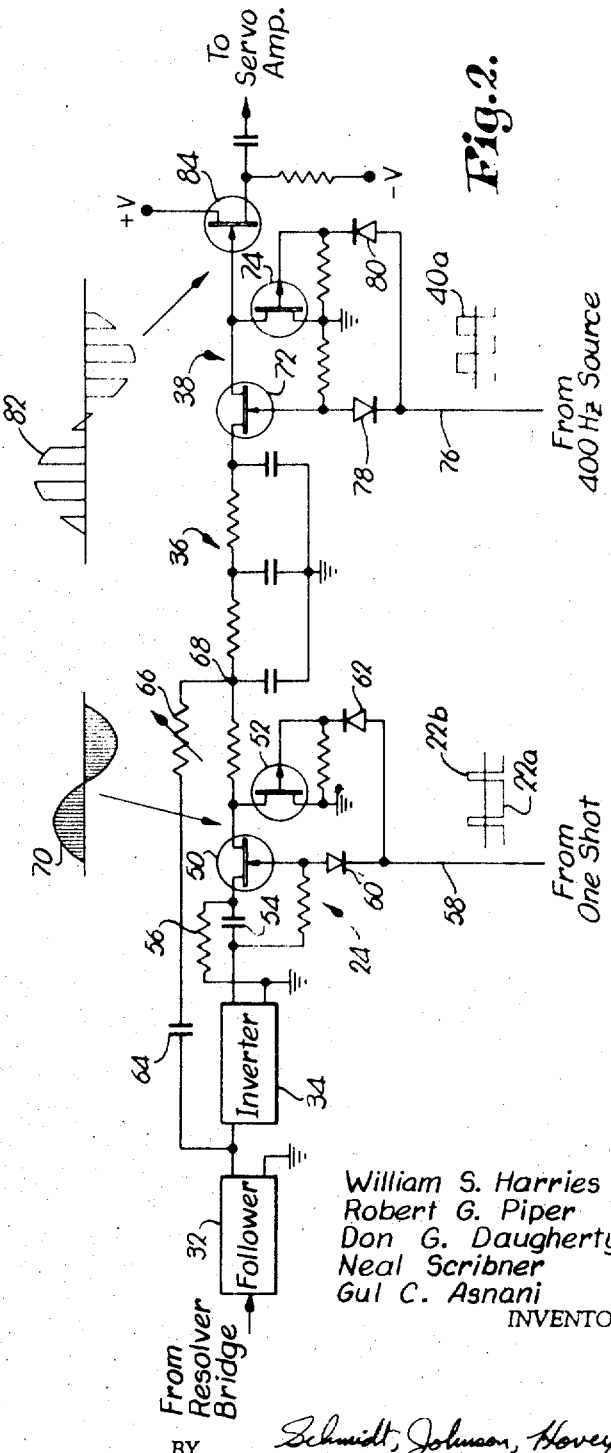
William S. Harries
Robert G. Piper
Don G. Daugherty
Neal Scribner
Gul C. Asnani
INVENTORS.

3,470,557
CHOPPER PHASE COMPARATOR FOR OMNIRANGE RECEIVERS
William S. Harries, Kansas City, Mo., Robert G. Piper, Shawnee, and Don G. Daugherty, Lawrence, Kans., and Neal Scribner, Independence, and Gul C. Asnani, Kansas City, Mo., assignors to Wilcox Electric Company, Inc., Kansas City, Mo., a corporation of Kansas
Filed June 21, 1968, Ser. No. 738,988
Int. Cl. G01s 1/44
U.S. Cl. 343—106                               14 Claims

ABSTRACT OF THE DISCLOSURE

A VOR receiver effects a phase comparison of the demodulated carrier of a navigation signal and the modulating signal component of the subcarrier thereof without demodulating the subcarrier. A chopper is employed to chop the demodulated carrier with a train of pulses provided by a monostable multivibrator triggered by a limiter to which the subcarrier is fed. Multiplication is effected by the chopper and, since the frequency of the demodulated carrier and the frequency of the modulating signal component of the subcarrier are the same, the product signal thus obtained has a direct current component proportional to the cosine of the phase angle therebetween.

---

The DC component of the product signal is subsequently used to modulate a control signal fed to the control winding of a two-phase servomotor utilized to drive a resolver in the receiver. Other components of the product signal includes a component at the mentioned common frequency and a component at twice such frequency, the former being suppressed by phase cancellation at the output of the chopper-multiplier. The second, higher frequency component is permitted to pass (as a second modulation on the control signal) to the servomotor control winding in order to reduce the static friction of the servomotor.

A commonly employed VHF navigational system for aircraft utilizes an airborne receiver which determines the phase relationship between a pair of detected radio signals. This relationship is displayed to the pilot or navigator in a manner to indicate the position of the aircraft relative to a ground reference point from which the signals are emanating. In the basic VHF omnidirectional range (VOR) system, for example, a high frequency carrier signal is radiated from a rotating transmitting antenna which has a 360° angular sweep. The carrier is also radiated from a nondirectional antenna and, to provide a reference, is amplitude modulated by a subcarrier which, in turn, is frequency modulated by a modulating signal having the same frequency as the sweep rate of the rotating antenna. Commonly, the carrier frequency is on the order of 110 mHz., the center frequency of the subcarrier is 9960 Hz. with a modulation swing of plus or minus 480 Hz., the sweep rate of the directional antenna is 30 revolutions per second, and the modulating signal for the subcarrier has a frequency, therefore, of 30 Hz.

The receiver in an aircraft within the range of the transmitted signals is aware of an amplitude modulation on the carrier due to the rotating field pattern of the transmitting antenna system. This is commonly referred to as "space modulation" and, as discussed above, is of the same frequency as the frequency modulation impressed upon the subcarrier. The subcarrier modulation is employed as a reference by the airborne receiver, and in the prior art the space modulation and the modulating signal impressed upon the subcarrier are both detected, a phase comparison then being made by the receiver circuitry to ascertain the phase difference between the two detected signals. Commonly, the space and frequency modulations are placed on their respective signals such that receivers located due north of the transmitting station will detect the modulations in phase, while receivers located other than due north of the station will receive the modulations out of phase by a angle characteristic of that particular azimuth.

From the foregoing it may be appreciated that any phase errors introduced into the detected carrier (variable signal) or detected subcarrier (reference signal) will necessarily result in an erroneous indication of the position of the aircraft relative to the transmitting station. Amplitude distortion is commonly present in the space (amplitude) modulated carrier due to the inherent susceptibility of an AM signal to such distortion. Thus, if the distorted, detected carrier is permitted to influence the phase comparison, an error results. Similarly, a possibility of error exists in the detection of the frequency modulated subcarrier since FM demodulators are often sensitive, to a degree, to amplitude fluctuations in the modulated signal. Amplitude modulation may be placed upon the subcarrier by atmospheric effects or by the receiver circuitry itself. Furthermore, it is important to suppress harmonics of the 30 Hz. variable and reference signals to preserve the accuracy of the phase comparison and, particularly in airborne equipment, the elimination of bulky components and weight reduction is always of high importance.

It is, therefore, the primary object of this invention to provide a phase-comparing radio navigation receiver which is capable of a high degree of harmonic rejection and is relatively insensitive to amplitude distortion that may be present in the detected carrier signal.

As a corollary to the foregoing object, it is an important aim of the instant invention to provide a means of comparing the phase of the amplitude fluctuations of the carrier with the phase of the reference signal without effecting demodulation of the frequency modulated subcarrier, thereby precluding the introduction of possible inaccuracies into the phase comparison by the demodulation process.

Another important object of the invention is to provide a receiver as aforesaid which utilizes a chopper circuit to effect the requisite phase comparison in order that the harmonic or spurious contents of the variable signal and the reference signal which are not common to the two signals will be prevented from passing to subsequent circuitry of the receiver and introducing inaccuracies into the system. Heretofore, some harmonic distortion has invariably been introduced into the variable signal by non-linearities in the receiver or by distortion and reflections in the RF path from the transmitter to the receiver. Furthermore, since the resolver circuit in the receiver tends to amplify distortion effects, the reference signal is conventionally routed through the resolver where it is also subject to some harmonic distortion. Additionally, prior phase comparison approaches are oftentimes responsive to distortion of either the variable or the reference signal and thus the accuracy of the equipment is adversely affected and a major limitation is placed on the accuracy obtainable.

Still another important object of the invention is to provide a chopper phase comparator as aforesaid in an arrangement which is particularly adapted to the driving of a servomotor with a minimum number of circuit stages.

Yet another object of the invention is to eliminate the bulk and weight of prior phase comparison approaches, particularly the transformers required by the sum and difference comparison method where the sum of two signals is rectified and detected and the difference rectified and detected to provide two resultant direct voltages whose difference is then determined.

In the drawing:

FIGURE 1 is a block diagram of an automatic VOR receiver incorporating the improvements of the instant invention; and FIG. 2 is an electrical schematic diagram showing the two chopper circuits in detail.

A receiving antenna 10 is connected to a conventional superheterodyne receiver system 12 employing the usual stages of RF amplification, conversion, and IF amplification. The IF signal is fed to an audio detector 14, the output of the detector 14 being split into two separate channels by a 9960 Hz. band-pass filter 16 and a low-pass filter 18. As the legends in FIG. 1 indicate, the bandpass filter 16 and the low-pass filter 18 divide the subsequent receiver apparatus into a reference channel and a variable channel respectively.

Using the above described VHF omnidirectional range navigation system as an example, the space modulated carrier is received by antenna 10, processed by the intermediary stages 12, and then demodulated by the detector 14 which also passes the 9960 Hz. subcarrier. The band-pass filter 16 eliminates the space modulation and allows the frequency modulated subcarrier to enter the reference channel substantially unattenuated. It may be appreciated that the space modulation is of quite low frequency (30 Hz. in the example) and thus the separation of the two signals by conventional filter networks may be readily accomplished. Similarly, therefore, the low-pass filter 18 suppresses the higher frequency subcarrier and permits the low frequency space modulation to enter the variable channel.

The subcarrier is processed in the reference channel by a limiter 20 and a monostable multivibrator or "one shot" 22. The limiter 20 effects amplification and amplitude limiting of the subcarrier and delivers the rectangular wave form thus obtained to the control input of the one shot 22. For purposes of illustration, it is assumed that the output of the one shot 22 is normally at a positive voltage level and, when triggered, assumes a negative voltage level for a predetermined time period set by the RC characteristics of the multivibrator circuitry. It is further assumed for purposes of explanation that the one shot 22 is triggered into its quasi-stable state by each positive-going wave front of the output from limiter 20. Thus, the one shot 22 delivers a pulse 22a of fixed duration (see graph in FIG. 2) during each period of the subcarrier. The duration of each pulse 22a is less than the length of the period corresponding to the highest frequency of the modulation swing of the subcarrier. For instance, with the 9960 Hz. subcarrier and a modulation swing of 480 Hz., the period of the subcarrier varies between approximately 95 and 105 $\mu$sec., thus the width of each pulse 22a may be set at approximately 85 $\mu$sec. or less.

The output of the one shot 22 is fed to one input of a chopper-multiplier 24 shown in detail in FIG. 2 and to be subsequently described. Referring to the variable channel, the output from the low-pass filter 18 (the demodulated carrier or variable signal) is fed to a resolver driver 26 which, in turn, excites a resolver 28 and a resolver bridge 30 via the inductive coupling through the resolver 28. The output from the resolver bridge 30 is fed to a resolver follower 32 for high to low impedance output of the follower 32 being coupled with the second input of the chopper-multiplier 24 by a phase inverter 34.

The output of the chopper 24 and the follower 32 are mixed as indicated by the flow lines and presented to the input of a low-pass filter 36 which feeds one input of a servo chopper 38. A 400 Hz. rectangular wave source 40 delivers its output (see wave form 40a in FIG. 2) to the second input of the servo chopper 38, the output of the latter being coupled with the input of a servo amplifier 42 which delivers a modulated 400 Hz. signal to the control winding of a two-phase servomotor 44. The servomotor 44 has a reference winding (not illustrated) which is excited by a sinusoidal 400 Hz. signal of constant amplitude. The output shaft 46 of the servomotor 44 is illustrated by the broken line and is mechanically coupled with the rotor of the resolver 28. Additionally, the motor shaft 46 is coupled to a radio magnetic indicator (RMI) 48. Normally, a servomechanism (not shown) would be employed to couple the motor shaft 46 with the RMI 48 in order to provide a means of mechanically superimposing the omnirange bearing information upon the magnetic compass bearing of the aircraft.

The circuit stages between the follower 32 and the servo amplifier 42 are shown in detail in FIG. 2. The chopper-multiplier 24 includes a series, a symmetrical, N-channel field effect transistor 50 and a shunt, symmetrical, P-channel field effect transistor 52, the output of the inverter 34 being connected to the channel input of the FET 50 by a coupling capacitor 54. An input resistor 56 is connected from the FET side of the capacitor 54 to the circuit common indicated by the ground symbol. A lead 58 provides the input connection for the output from the one shot 22 and is connected to two oppositely poled diodes 60 and 62, the latter being connected to the gates of FETS 50 and 52 respectively. Each of the FETS 50 and 52 serves as a high speed switch, each FET being normally conductive but nonconductive when pulse energy of appropriate polarity from the one shot 22 is applied to its gate. Thus, by virtue of the arrangement of the diodes 60 and 62, the FET 50 is off during pulse 22a and the FET 52 is off during the pulse 22b produced when the multivibrator returns to its stable state during each period of the subcarrier.

Part of the output from the follower 32 is fed ahead of the inverter 34 through a series connected DC blocking capacitor 64 and a variable resistor 66 to a junction point 68 common to the output of the chopper circuit 24 and the input of the low-pass filter 36. As will be explained more fully hereinafter, this is for the purpose of mixing the demodulated carrier with the product signal illustrated at 70 obtained at the output of the chopper-multiplier 24 in order to effect phase cancellation of the 30 Hz. component of the product signal 70. The low-pass filter 36 may, for example, have an attenuation characteristic on the order of 12 db per octave beginning at approximately 15 Hz.

The servo chopper 38 has a series, symmetrical, N-channel FET 72 and a shunt, symmetrical P-channel FET 74 arranged in a switching configuration similar to the chopper-multiplier 24. The channel input of the FET 72 is connected to the output of the low-pass filter 36. A lead 76 provides an input connection from the 400 Hz. source 40 and is connected to the gates of the FETS 72 and 74 by oppositely poled diodes 78 and 80. Thus, the FETS 72 and 74 are rendered alternately non-conductive by the positive and negative half cycles of the 400 Hz. signal 40a. The chopped output signal from chopper 38 is illustrated at 82 and is fed to the input of a source follower 84 employing a symmetrical FET for conversion from high input impedance to low output impedance for driving the servo amplifier 42.

Operation

In the reference channel, the 9960 Hz. subcarrier controls the triggering of the one shot 22 as discussed hereinabove. It is to be remembered that, in the exemplary VOR system illustrated, the subcarrier is frequency modulated by a 30 Hz. signal which has the same phase at a given instant regardless of the azimuth of the airborne receiver with respect to the ground transmitting station. Thus, the period of the subcarrier is constantly varying from approximately 95 to 105 $\mu$sec. in length. For this reason, the off time (in the stable state) of the one shot 22 illustrated by the positive pulse 22b during each period of the subcarrier is constantly changing in duration between 10 and 20 μsec. Either the negative pulses 22a of constant width or the positive pulses 22b of varying width may be utilized to chop the 30 Hz. signal in the variable channel as both pulse trains have a repetition rate that is dependent upon the frequency of the subcarrier.

In the circuitry of the instant invention illustrated in FIG. 2, the variable width, positive pulses 22b from the one shot output are utilized to chop the 30 Hz. variable channel signal delivered to the chopper-multiplier 24 by the inverter 34. This 30 Hz. signal is the demodulated carrier shifted in phase by the action of the resolver and resolver bridge 28, 30 and the inverter 34. when either of the diodes 60 or 62 are back-biased, the respective FET gate is biased to the potential of one side of the FET channel to permit conduction of the 30 Hz. variable signal therethrough. When the positive pulse 22b is present, the gate of the shunt FET 52 is elevated to a pinch-off potential, the FET 52 thus being rendered nonconductive while the series FET 50 is conducting the 30 Hz. variable signal and permitting passage thereof to the low-pass filter 36. When one of the negative pulses 22a subsequently appears on input lead 58, the gate of the series FET 50 is driven negative to render the FET 50 nonconductive while the shunt FET 52 returns to its conductive state, thereby absolutely precluding passage of the 30 Hz. variable signal through the chopper circuit 24 and grounding the input of the low-pass filter 36. In this manner, the 30 Hz. variable signal is chopped and multiplication of the two input signals also occurs due to the existence of the 30 Hz. modulating signal component (reference signal) in the pulse input 58 from the one shot 22.

To explain more fully, useful multiplication is effected in the chopper 24 since both the signal to be chopped and the chopping signal have like frequency components. The products obtained and present in the resultant signal 70 are a 30 Hz. component evidenced by the envelope of the resultant signal 70, a 60 Hz. component, a direct current component proportional to the cosine of the phase angle between the two 30 Hz. signals multiplied, and high frequency products of the 9960 Hz. chopping pulses. The cosine is at a maximum at 0° and 180° (+1 and −1 respectively) and is zero at 90° and 270°. Thus, the DC component is not present when the phase difference of the variable and reference signals is 90°, this being the case since the energy in the two half cycles of the resultant, product signal 70 is the same. Conversely, maximum energy unbalance occurs when the 30 Hz. variable and reference signals are either in phase or 180° out of phase. It is apparent, therefore, that the amplitude of the DC component of the product signal 70 is indicative of the phase relationship between the two 30 Hz. signals in the respective channels of the receiver. It is noteworthy, however, that this phase comparison information is obtained in the instant invention without demodulating the 9960 Hz. subcarrier, and hence without the possibility of amplitude modulation distortion of the subcarrier affecting the accuracy of the phase comparison since the receiver is insensitive to amplitude modulation that may be present on the subcarrier.

It should also be appreciated that the DC level of the product signal 70 is independent of the harmonic content of the chopper input signals since the 30 Hz. frequency modulation on the subcarrier in the reference channel should have no harmonic content other than that introduced at the transmitter, and the DC components of the product signal 70 is affected only by signals of like frequency which are present in both inputs of the chopper 24. Thus, since the input from the reference channel is relatively clean and free of harmonic content, the other input from the variable channel can be considerably distorted by harmonics picked up in the receiver and the resolver circuits and yet not affect the accuracy of the phase comparison.

The 30 Hz. component of the product signal 70 is several times greater in amplitude that the 60 Hz. component thereof and thus raises the problem of saturation of the succeeding stages since the DC component of the product signal 70 is to be utilized to control the operation of the servomotor 44. Furthermore, the 30 Hz. component of the product signal 70 is comparatively large with respect to the normal DC error voltages and cannot be adequately attenuated without disturbing the stability and response of the servo loop. It is, therefore, desired that the 30 Hz. component be eliminated and, to this end, cancellation thereof is effected at junction point 68. The product signal 70 is mixed with a 30 Hz. signal derived from the demodulated carrier at a point prior to the inversion of the latter, the resistor 66 being adjusted until a null in the 30 Hz. component at point 68 is obtained.

The remainder of the product signal 70 passes to the servo chopper 38 through the low-pass filter 36. This filter eliminates all high frequency products of the 9960 Hz. chopping pulses and attenuates the 60 Hz. component. The input signal to the servo chopper, therefore, has a DC error signal component and a 60 Hz. component, the latter being of a constant level, now attenuated sufficiently to avoid saturation of peaks in all succeeding stages.

The gate signal to the servo chopper 38 is the square wave 40a from the 400 Hz. source 40. Servo chopper 38 operates in the same fashion as described above for the chopper-multiplier 24, the chopped 60 Hz. signal (no DC error signal component) being illustrated by the wave form 82. The multiplication products produced comprise the sum and difference of 400 Hz. and 60 Hz., i.e., 340 Hz. and 460 Hz. signals of constant amplitude; a 400 Hz. signal, the amplitude of which is dependent on the DC error signal; and a number of higher frequency signals as a result of the 400 Hz. square wave harmonics. The latter are subsequently eliminated by the frequency characteristics of the servo amplifier 42.

It may be seen, therefore, that when the DC error signal is zero, the control signal at the output of the servo amplifier 42 takes the form of a double side band, suppressed carrier modulation of a 400 Hz. signal by the 60 Hz. component of the product signal 70. The control signal may be visualized as a 400 Hz. signal whose phase relationship to the 400 Hz. reference winding signal on the servomotor 44 alternates back and forth between 90° leading and 90° lagging. Motion is induced in the servomotor by 400 Hz. signals on the control winding which are 90° displaced electrically from the signal on the reference winding, rotating in one direction for 90° leading and the other direction for 90° lagging. Therefore, when the control signal is applied to the control winding of the servomotor 44, the rotor will have no net movement, yet will vibrate or "dither" at a 60 Hz. rate. Since this vibration frequency is far above the response frequency of the motor, the movement of the motor shaft is imperceptible yet adequate to eliminate much of the static friction normally encountered in a stationary motor. The result is a substantial increase in motor sensitivity.

When the aircraft deviates from a given heading, this is immediately sensed by the receiver since the phase angle between the 30 Hz. variable channel signal and the 30 Hz. reference signal at the inputs of the chopper-multiplier 24 deviates, thereby causing the production of either a positive or a negative DC component in the output of the chopper-multiplier 24, depending upon the direction of the change of the heading. Thus, although the 60 Hz. component of the chopper-multiplier 24 product is still present at its output, such 60 Hz. component may now be visualized as displaced either in a positive or negative direction from zero potential. When this DC error signal is applied to the servo chopper 38, the product formed with the 400 Hz. chopping signal is another 400 Hz. signal whose amplitude is a function of the magnitude of the DC error signal and whose phase depends on the sign of such error signal. This 400 Hz. signal is amplified in the servo amplifier 42 along with the modulated 400 Hz.

signal described previously. The phasing of these signal components is such that the phase of the 400 Hz. signal developed from the DC error signal is either 90° lagging or 90° leading with respect to the servomotor reference winding signal and thus causes the motor shaft 46 to move in one direction or the other depending on the sign of the error signal. The mechanical link between the servomotor shaft 46 and the resolver 28 transfers this motion to the resolver 28, and the resultant resolver rotor movement shifts the phase of the 30 Hz. variable signal in such a manner to correct for any deviation from a 90° phase relationship between the 30 Hz. variable signal and the 30 Hz. reference signal at the inputs to the chopper-multiplier 24. The angular position of the resolver rotor, when such rotor has been shifted to introduce the amount of phase shift in the variable signal necessary to achieve a balanced condition, is an indication of the phase difference between the 30 Hz. reference signal and the 30 Hz. variable signal prior to the resolver 28.

It should be understood that the rotor of the resolver 28 is displaced 180° in order to compensate for the phase inversion effected by inverter 34 prior to feeding the 30 Hz. variable signal to the chopper-multiplier 24. Manifestly, the servo mechanical coupling between the rotor of the resolver 28 and the RMI 48 is such that the RMI 48 gives a reading that is a function of the angular disposition of the resolver rotor or the servomotor shaft 46 in terms of degrees azimuth. It is required in the exemplary VOR system herein that the reading of the RMI 48 correspond to zero phase difference between the space modulated carrier and the reference signal on the subcarrier as received at the antenna 10 when the airborne receiver is directly north of the transmitting station, irrespective of the phases of these signals within the receiver circuitry.

Having thus described the invention, what is claimed as new and desired to be secured by Letters Patent is:

1. Apparatus for receiving an incoming signal having a carrier whose amplitude varies at a predetermined modulation frequency and a subcarrier which is frequency modulated by a modulating signal component of said frequency, said apparatus comprising:
    detector means adapted to have said incoming signal applied thereto and responsive to the latter for demodulating said carrier and passing said subcarrier;
    means coupled with said detector means and responsive to said subcarrier for providing a train of output pulses having a repetition rate dependent upon the frequency of the subcarrier; and
    chopper circuitry having a pair of inputs coupled with said pulse providing means and said detector means respectively for receiving said pulses and the demodulated carrier,
    said circuitry being responsive to said pulses and said demodulated carrier for chopping the latter with said pulses to produce a resultant, product signal having a direct current component proportional to the cosine of the phase angle between the demodulated carrier and the modulating signal component of said subcarrier, whereby said direct current component is indicative of the relative phases of the demodulated carrier and said modulating signal component and is obtained without demodulating the subcarrier.

2. Apparatus as claimed in claim 1,
    there being first frequency selective means interposed between said detector means and said pulse providing means for selectively passing said subcarrier; and
    second frequency selective means interposed between said detector means and the respective input of said chopper circuitry for selectively passing said demodulated carrier.

3. Apparatus as claimed in claim 1,
    said product signal having a second component of said predetermined frequency; and
    means coupled with the output of said chopper circuitry for mixing said product signal with a signal 180° out of phase with the demodulated carrier appearing at the respective input of said circuitry, whereby to obtain phase cancellation of said second component of the product signal.

4. Apparatus as claimed in claim 1;
    and first frequency selective means coupled with said detector means for selectively passing said subcarrier,
    said pulse providing means including limiter means coupled with said first frequency selective means and responsive to said subcarrier for effecting amplitude limiting thereof, and a monostable multivibrator having an input for receiving the amplitude limited subcarrier and an output for delivering said pulses, each of said pulses occurring during a respective period of said amplitude limited subcarrier.

5. Apparatus as claimed in claim 1,
    there being controllable variable phase shifting means interposed between said detector means and the respective input of said chopper circuitry and operable to effect a shift in the phase of said demodulated carrier; and
    control means coupled with the output of said circuitry and said phase shifting means and responsive to said direct current component of the product signal for varying the phase shifting means until a null in said direct current component is obtained.

6. Apparatus as claimed in claim 5,
    said phase shifting means having a movable device for varying the degree of phase shift effected thereby, said control means including a servomotor having an output member mechanically coupled with said devices.

7. Apparatus as claimed in claim 6,
    said servomotor being responsive to excitation of a particular frequency; and
    means for supplying an electrical signal of said particular frequency,
    said control means including chopper means having a pair of input connections coupled with the output of said chopper circuitry and with said supply means respectively for receiving said product signal and said signal of particular frequency,
    said chopper means having its output coupled with said servomotor and being responsive to said signal of particular frequency and said product signal for chopping the latter with said signal of particular frequency to provide said excitation, whereby to drive the servomotor when the product signal contains said direct current component.

8. Apparatus as claimed in claim 7,
    said product signal having second and third components of said predetermined frequency and two times said predetermined frequency respectively; and
    means for suppressing said second component of predetermined frequency, whereby said third component of two times said predetermined frequency is permitted to reach the servomotor as a modulation on the signal of particular frequency to reduce static friction.

9. Apparatus as claimed in claim 7,
    said product signal having second and third components of said predetermined frequency and two times said predetermined frequency respectively,
    there being means coupled with the output of said chopper circuitry for mixing said product signal with a signal 180° out of phase with the demodulated carrier appearing at the respective input of said circuitry, whereby to obtain phase cancellation of said second component of the product signal; and
    low-pass filter means coupled between the output of said circuitry and said control means for reducing the amplitude of said third component of the product signal to a level substantially less than the amplitude of said direct current component obtained when said phase angle deviates from 90°, but sufficient as a modulation on the signal of particular frequency to reduce the static friction of the servomotor.

10. In equipment for receiving a first signal of predetermined frequency and a second, higher frequency signal which is frequency modulated by a modulating signal component of said predetermined frequency, apparatus for automatically correcting the relative phases of said first signal and said modulating signal component to provide a 90° phase difference therebetween at a pair of inputs within the apparatus, said apparatus comprising:

means responsive to said second signal for providing a train of output pulses having a repetition rate dependent upon the frequency of the second signal;

chopper circuitry having said pair of inputs, one of the latter being coupled with said pulse providing means for receiving said pulses therefrom;

controllable variable phase shifting means coupled with the other of said inputs for receiving said first signal and operable to effect a shift in the phase thereof and feed the phase shifted first signal to said other input, said circuitry being responsive to said pulses and said first signal fed thereto for chopping the latter with said pulses to produce a resultant, product signal having a direct current component proportional to the cosine of the phase angle between the first signal at said other input and the modulating signal component of said second signal, whereby said direct current component is indicative of the relative phases of the first signal at said other input and said modulating signal component; and control means coupled with the output of said circuitry and said phase shifting means and responsive to said direct current component of the product signal for varying the phase shifting means until a null in said direct current component is obtained, whereby to obtain the 90° phase difference at said inputs between the phase shifted first signal and the modulating signal component of said second signal.

11. Apparatus as claimed in claim 10, said phase shifting means having a movable device for varying the degree of phase shift effected thereby, said control means including a servomotor having an output member mechanically coupled with said device.

12. Apparatus as claimed in claim 11, said servomotor being responsive to excitation of a particular frequency; and means for supplying an eelctrical signal of said particular frequency, said control means including chopper means having a pair of input connections coupled with the output of said chopper circuitry and with said supply means respectively for receiving said product signal and said signal of particular frequency.

said chopper means having its output coupled with said servomotor and being responsive to said signal of particular frequency and said product signal for chopping the latter with said signal of particular frequency to provide said excitation, whereby to drive the servomotor when the product signal contains said direct current component.

13. Apparatus as claimed in claim 12, said product signal having second and third components of said predetermined frequency and two times said predetermined frequency respectively; and means for suppressing said second component of predetermined frequency, whereby said third component of two times said predetermined frequency is permitted to reach the servomotor as a modulation on the signal of particular frequency to reduce static friction.

14. Apparatus as claimed in claim 12, said product signal having second and third components of said predetermined frequency and two times said predetermined frequency respectively, there being means coupled with the output of said chopper circuitry for mixing said product signal with a signal 180° out of phase with the first signal at said other input of said circuitry, whereby to obtain phase cancellation of said second component of the product signal; and low-pass filter means coupled between the output of said circuitry and said control means for reducing the amplitude of said third component of the product signal to a level substantially less than the amplitude of said direct current component obtained when said phase angle deviates from 90°, but sufficient as a modulation on the signal of particular frequency to reduce the static friction of the servomotor.

References Cited

UNITED STATES PATENTS

| 2,513,477 | 7/1950 | Gubin | 324—83(a) |
| 2,924,822 | 2/1960 | De Faymoreau et al. | 343—106 |
| 3,290,686 | 12/1966 | Kobbe | 243—106 X |

RODNEY D. BENNETT, Jr., Primary Examiner

H. C. WAMSLEY, Assistant Examiner

U.S. Cl. X.R.

324—83